W. FERRIS.

Pitman-Connections for Harvesters.

No. 133,363.  Patented Nov. 26, 1872.

Witnesses:
A. Bennerkendorf.
C. Sedgwick

Inventor:
W. Ferris
Per [signature]
Attorneys.

UNITED STATES PATENT OFFICE.

WILLIAM FERRIS, OF PLEASANT PLAIN, OHIO.

IMPROVEMENT IN PITMAN-CONNECTIONS FOR HARVESTERS.

Specification forming part of Letters Patent No. 133,363, dated November 26, 1872.

*To all whom it may concern:*

Figure 1:
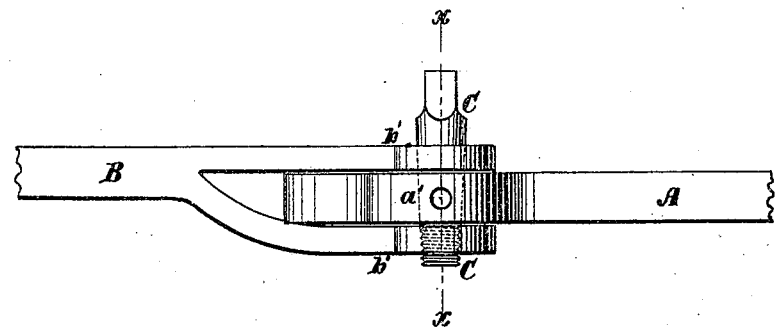
Figure 2:
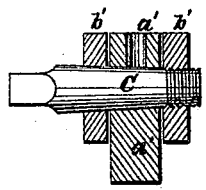

Be it known that I, WILLIAM FERRIS, of Pleasant Plain, in the county of Warren and State of Ohio, have invented a new and useful Improvement in Knife and Pitman Connection for Reapers and Mowers, of which the following is a specification:

Figure 1 is a top view of the adjacent ends of a sickle-bar and pitman, illustrating my connection. Fig. 2 is a detail section of the same taken through the line *x x*, Fig. 1.

Similar letters of reference indicate corresponding parts.

My invention has for its object to furnish an improved device for connecting the sickle-bar and pitman in reapers and mowers which shall be simple in construction, convenient in use, and effective in operation, taking up the play between the knife-bar and pitman, enabling the wear to be conveniently taken up, and which will greatly diminish the wear and lessen the draft of the machine; and it consists in the tapering hole formed through the eye of the sickle-bar and the branched ends of the pitman, having a screw-thread cut in the said hole in one or both of said branches and the wooden pin, to form a connection between the sickle-bar and pitman of a harvester or mower, as hereinafter more fully described.

A represents the knife or sickle bar, upon the inner end of which is formed an eye, *a'*. B represents the pitman, the end of which has two branches, *b'*, formed upon it to receive the eye *a'* between them. Through the ends of the branches *b'* and through the eye *a'* is formed a tapering hole, having a screw-thread cut in the smaller part that passes through the branches *b'*, or in both of said branches. C is a wooden pin, made of as great a length as possible without interfering with any of the mechanism of the machine. The forward end of the wooden pin C is pointed sufficiently to enter the thread of the said tapering hole. The other or rear end of the pin C is squared off, to enable a wrench to take hold of it to force it in.

By this arrangement as the pin C wears it is screwed forward, so that the wear may come upon another place, the forward end being always cut off as it projects.

Having thus described my invention, I claim as new and desire to secure by Letters Patent—

The tapering hole formed through the eye *a'* of the sickle-bar A and the branched ends *b'* of the pitman B, having a screw-thread cut in the said hole in one or both of said branches, and the wooden pin C to form the connection between the cutter-bar and pitman of a harvester or mower, substantially as herein shown and described, and for the purposes set forth.

WILLIAM FERRIS.

Witnesses:
    JOHN R. HITESMAN,
    JOHN FERRIS.